Feb. 20, 1973     T. S. SCHAEFER     3,717,357
ADJUSTABLE DOLLY CONSTRUCTION
Filed July 27, 1970
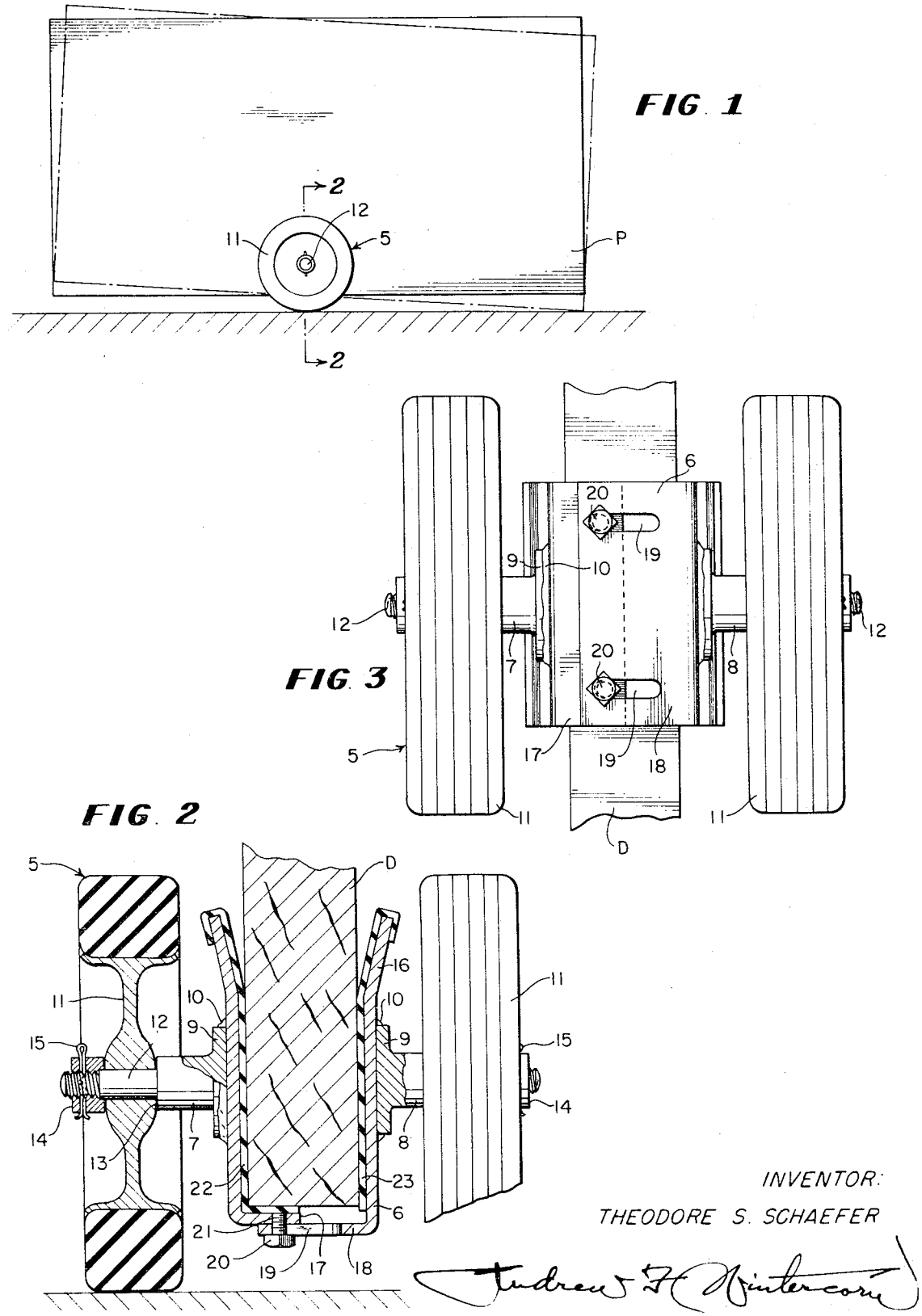
INVENTOR:
THEODORE S. SCHAEFER

United States Patent Office 3,717,357
Patented Feb. 20, 1973

3,717,357
ADJUSTABLE DOLLY CONSTRUCTION
Theodore S. Schaefer, 3022 W. Scott Ave., McHenry, Ill. 60050
Filed July 27, 1970, Ser. No. 58,473
Int. Cl. B62b 1/14
U.S. Cl. 280—35                1 Claim

ABSTRACT OF THE DISCLOSURE

This dolly has the bottom inturned flanges of its two L-shaped stamped sheet metal frame members overlapped so that screws extending through parallel slots in one flange and threaded in holes in the other flange permit slidably adjusting these members for width adjustment of the frame. The U-frame formed by these members is springable under weight to close on opposite sides of the door or panel placed therein and the protective liners of sheet rubber or other cushioning material not only protect the article from damage but help to grip it more firmly. The U-frame being heavier on the bottom and mounted so its center of gravity is below the axle axis tends to gravitate to an upright position for easier loading.

---

This invention relates to a new and improved adjustable two-wheel dolly construction, especially designed and adapted to receive and carry doors, metal toilet and other partitions, plywood panels, counter tops, wallboard and other similar materials, whereby to make it possible and entirely practical for one man to handle and move such loads with comparative ease and facility whereas heretofore ordinarily two men were necessary.

Salient features of the present dolly construction are the ease with which the width of the carriage can be changed to suit different requirements, and the fact that this carriage has its center of gravity below the axle so that it always assumes an upright position when unloaded and does not have to be turned around in order to receive the object or objects to be carried. Incidentally, when the dolly is adjusted to the proper closeness, the slight springiness in the dolly's construction taken in conjunction with the rubber cushioning liners on the inside of the two halves of the dolly makes for a desirable gripping action as the two halves close under load on opposite sides of the edge portion of a door entered therebetween, thereby causing the dolly to grip its load and maintain its selected location with respect to the center of gravity and yet there is no problem of detaching the dolly when not under load.

This invention is illustrated in the accompanying drawing, in which:

FIG. 1 is a side view of my improved dolly shown in use carrying one or more plywood panels, for example, located at the balance point or near to it for ease in movement and steering of the load, and in the case of a door, for example, to enable the dolly being used as a workholder when the place for mounting the door is reached and the door hinges (and kickplate sometimes) have to be fastened to it, the work in such a situation receiving three-point support, two at the dolly and one at the far end of the work;

FIG. 2 is a view partly in vertical section on the line 2—2 of FIG. 1, and partly in front elevation, showing the dolly adjusted to its maximum width, and FIG. 3 is a bottom view of FIG. 2.

The same reference numerals are applied to corresponding parts in these three views.

The dolly indicated generally by the reference numeral 5 comprises a generally U-shaped frame 6 with coaxially arranged axles 7 and 8 welded or otherwise suitably secured at their inner ends by their radially enlarged flange portions 9 to the opposite sides of the U-shaped frame as indicated at 10, wheels 11 being mounted for rotation on the reduced outer end portions 12 of the axles in a desired spaced relationship to the opposite sides of the U-frame 6 by abutment with the annular shoulders 13 on the axles defined at the inner ends of their reduced portions 12. Nuts 14 threading on the outer end of the reduced axle portions 12 retain the wheels 11 and have cotter pins 15 passed through registering holes in the nuts and axle portions to lock the nuts in place. The wheels 11 are preferably rubber tired, as shown, for quiet running and reduced likelihood of skidding in the travel thereof. The heavier cross-portion of the U-frame 6 gravitates to the bottom when the dolly is not loaded and that, taken with the diverging relationship of the upper end portions 16 on the sides of the U-frame 6 for easier entry of the edge portion of a door or panel or panels, makes for easier loading of the dolly.

The dolly frame 6 is adjustable in width to accommodate different thicknesses of doors, for example, and for that purpose there is an inturned bottom flange 17 on one half of the frame which overlaps an inturned flange 18 on the bottom of the other half of the frame, the latter flange being much wider as best appears in FIG. 2 and having slots 19 provided therein near the opposite ends thereof, parallel to the axle portion 12 through which screws 20 threaded in holes 21 in the flange 17 are entered to clamp the halves of the frame 6 in adjusted relationship. Liners 22 and 23 of sheet rubber or other suitable cushioning material are applied to the inner sides of the two halves of the frame 6, as shown, covering also the outer ends of the diverging portions 16 to protect the door or other object against being scratched in the hauling thereof and while the dolly may be used as a work-holder as previously mentioned. These liners also serve, incidentally, when the frame 6 is adjusted to the proper closeness in relation to the thickness of the door or other object or objects to be carried as a gripping means to maintain the selected location of a dolly with respect to the center of gravity by preventing slippage, the slight springiness in the dolly's frame construction taken in conjunction with the rubber liners making for a highly desirable cushioned gripping or vise action as the two halves of the frame 6 close under load on opposite sides of the edge portion of a door or the like entered therebetween, and yet there is no problem whatever in detaching the dolly from the objects when not under load. The frame 6, as shown in the botom view FIG. 3, is of ample length for good support of the load with the two ends symmetrically spaced with respect to the pivotal axis for good balance.

In operation, where there are a number of doors to be hauled, for example, from the point of delivery off a truck to a place of storage within a building for later distribution to where they are to be prepared for fitting and hanging, it is obvious that the width adjustment of the frame 6 once made will usually not have to be changed until another job is encountered calling for a narrower space in frame 6. The door D, illustrated in FIGS 2 and 3, requires the maximum width setting of the frame 6 but a panel P such as that shown in FIG. 1 of plywood or wallboard is usually much thinner and requires a narrower setting. Even where two or more panels may be loaded at one time in the dolly a narrower setting may be necessary. In any case, it is usually desirable to take advantage of the gripping action of the dolly attributable partly to the cushioning liners 22 and 23 and partly to the inherent springiness of the frame 6 under load, and the user of these dollies soon learns how closely to make the setting for best all-around performance. Good gripping action is of advantage, not only in the transportation of the door or other object but also when the dolly serves as a work-holder while the hinge seats are being routed out and the hinge butts (and a kickplate sometimes) are being fastened to the door, all without necessity for removing the door from the dolly, the door having three-point support, as previously mentioned—two points furnished by the dolly and the third point by the far end of the door resting on the floor.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. An adjustable dolly comprising an elongated upright article supporting frame carried on a pair of upright parallel wheels vertically disposed alongside the opposite sides of said frame and attached by coaxially disposed horizontal axles secured to opposite sides of said frame, said frame being of generally U-shape in cross-section and including two generally L-shaped frame members, each having a bottom inwardly projecting flange, these flanges overlapping to define the bottom cross-portion of said U-shaped frame, which, besides overweighting the bottom portion of said frame to gravitate relative to said axles when not loaded to a normal upright load-receiving position, serve for adjustment of the frame's width by slidable adjustment of screws threadedly mounted on one of said flanges in slots provided in the other of said flanges extending in substantially parallel relationship to said axles, the L-shaped frame members of said U-frame being of stamped sheet metal construction having a predetermined flexibility and resilience, whereby when adjusted to a certain closeness with respect to the opposite sides of an article to be carried in said frame are adapted to be sprung inwardly under the load of said article when loaded in said frame, to close on said article and obtain a gripping action, and liners of cushioning material on said L-shaped frame members which, besides protecting the article from damage in hauling, serve to improve the gripping action, the flange on which the screws are threadedly mounted from below the cross-portion of the U-frame being disposed above the slotted flange and the liner on that frame member carrying the screws being extended over the flange thereon for protection of the bottom edge of the article from any possible damaging contact with the upper end of either of said screws.

References Cited

UNITED STATES PATENTS

| | | | |
|---|---|---|---|
| 1,339,861 | 5/1920 | Paddon | 280—47.13 X |
| 2,446,023 | 7/1948 | Pohl | 280—35 |
| 2,220,160 | 11/1940 | Kriger | 280—47.32 UX |
| 803,185 | 10/1905 | McKinley | 280—47.13 R |
| 1,103,486 | 7/1914 | Cobb | 280—47.13 R |
| 2,534,367 | 12/1950 | Perrotta et al. | 280—79.1 UX |
| 2,816,771 | 12/1957 | Hunt | 280—47.13 R |
| 2,917,789 | 12/1959 | Kasper | 280—79.1 X |

FOREIGN PATENTS

| | | | |
|---|---|---|---|
| 83,933 | 5/1954 | Norway | 280—47.13 R |
| 40,713 | 8/1907 | Switzerland | 280—47.13 R |

BENJAMIN HERSH, Primary Examiner

J. A. PEKAR, Assistant Examiner

U.S. Cl. X.R.

280—47.13 R, 79.1